J. CAMPEN.
Soldering Apparatus.
No. 232,681.  Patented Sept. 28, 1880.
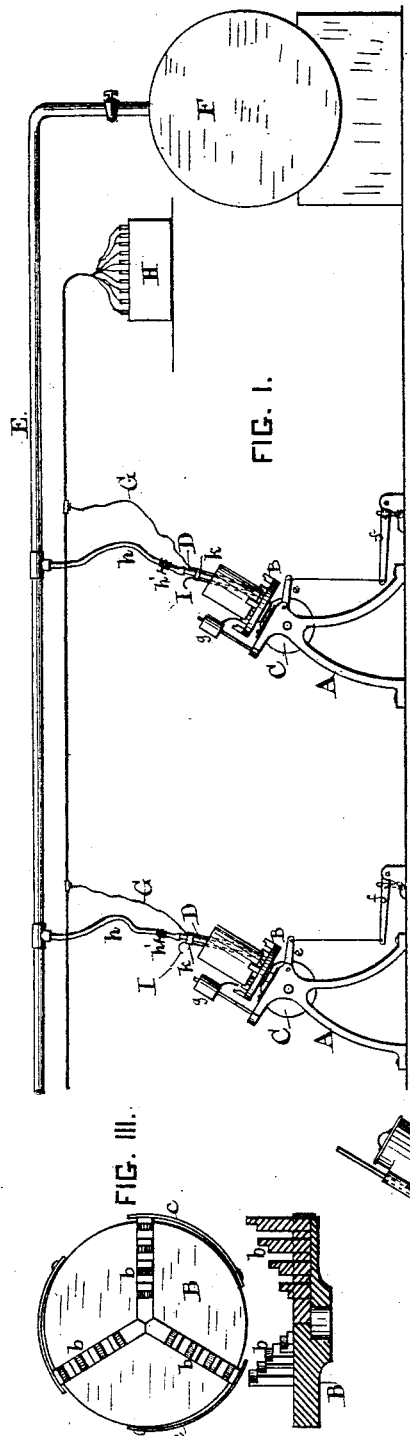
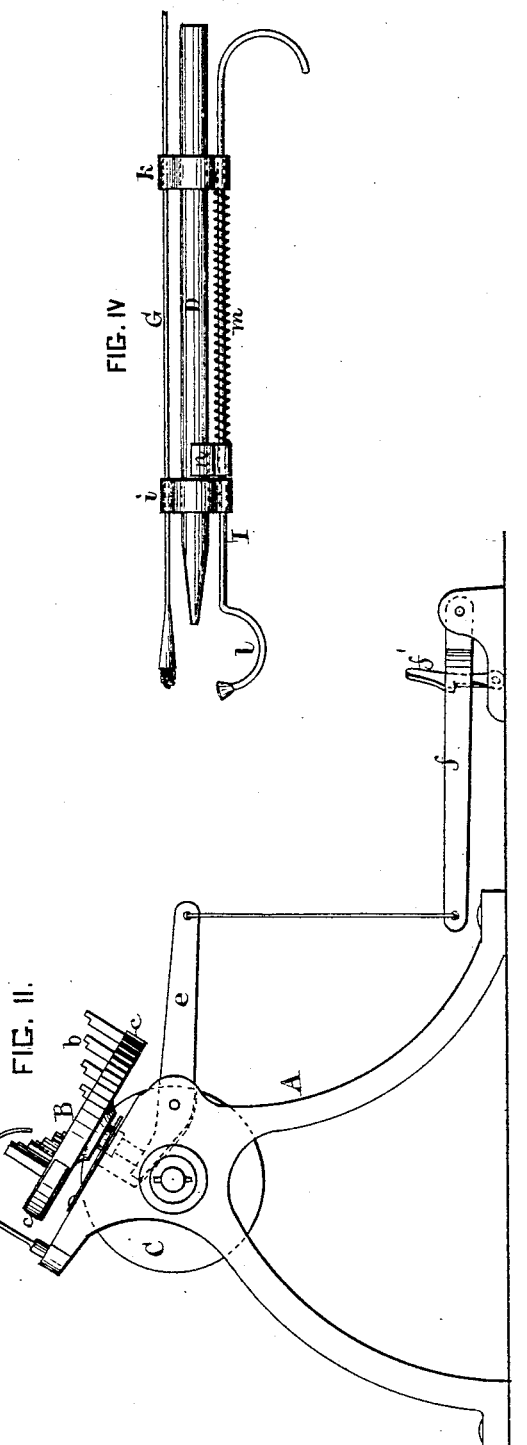
WITNESSES:
C. H. Miller
Ed. J. G. Otto
INVENTOR:
John Campen.

UNITED STATES PATENT OFFICE.

JOHN CAMPEN, OF BALTIMORE, MARYLAND.

SOLDERING APPARATUS.

SPECIFICATION forming part of Letters Patent No. 232,681, dated September 28, 1880.

Application filed January 16, 1880.

*To all whom it may concern:*

Be it known that I, JOHN CAMPEN, of the city of Baltimore, in the State of Maryland, have invented a new and useful Improved Apparatus in Soldering Metallic Seams, which improvement is fully set forth in the following specification and drawings.

My invention relates to an improved apparatus for soldering metallic seams, such as those of cans for fruit, vegetables, oysters, and for other articles; and the object is to more expeditiously, economically, and neatly solder such cans or other articles.

The invention consists in apparatus for soldering metallic seams, such as those of cans, or articles of any other description, by means of a blow-pipe for an electric flame, combined with compressed air; and it also consists in certain apparatus and devices for carrying out my invention, all of which will be more fully described hereinafter, reference being had to the accompanying drawings and the letters of reference marked thereon.

In the accompanying drawings, Figure I is a side elevation of two machines connected by suitable connections with the compressed-air reservoir and galvanic battery. Fig. II is an enlarged view of one of the machines. Fig. III is a plan and section of the adjustable chuck. Fig. IV is a side view of my improved blow-pipe.

In the drawings, A represents a suitable stand for the reception of a chuck, B, which is preferably arranged in an inclined manner, so as to be handy for the workmen. This chuck is provided with a series of grooved sliding pieces, *b*, which are forced toward the center by springs *c*, so that it can be adjusted to different sizes of cans. The chuck receives its motion by a friction-pulley, C, and can be thrown out of contact by a lever, *e*, and foot-treadle *f*, by which the chuck can be raised and then secured, if desired.

A hook or notched piece, *f'*, may be attached to the stand A to pass onto the upper surface of the treadle *f* and hold it, and by which means the chuck is raised out of contact with the friction-wheel.

At one side of the stand A is arranged a vessel, *g*, with a small spout for the muriatic acid usually used in soldering.

The blow-pipe consists of a tube, D, having one end tapered to form a small orifice, while its other end is connected to a flexible tube, *h*, provided with a suitable cock, *h'*, and is attached to a pipe, E, secured to the ceiling, wall, floor, or any suitable place, and connecting with a tank or reservoir, F, for compressed air. To the tube are secured two clamps, *i k*, through which, on one side, passes one end of an electric wire, G, provided with a holder for a piece of carbon or a piece of platinum, while the other end is connected to a galvanic battery, H, of ordinary and suitable construction. Upon the other side of the tube D is arranged a sliding bar, I, having its lower end, *l*, curved and provided with a piece of platinum, and it serves to hold the solder and prevents it from revolving with the can during the operation of soldering. The platinum end of the curved part of bar I being placed against the bottom of the can, the solder placed in the can comes in contact with the said platinum end, and is thus prevented from turning with the can, and will be almost instantly melted by the flame.

The upper end of the bar I is curved so as to be raised by a finger after the solder is melted, and a spring, *m*, between the clamps *i k* tends to force the bar down again to its normal position. To prevent the bar I from turning, a clasp, *n*, is provided, which slides up and down on the tube D. The clasp *n* is secured to the bar I, and is provided with two curved prongs, which partly clasp the tube D, and thus prevent the bar I and solder-holder from turning.

This blow-pipe forms a very important part of my invention, as it is simple in its construction and meets all the requirements in a very compact form, and combines blowing-tube, electric wire, and solder-holder in one implement.

The operation is as follows: The can or other article to be soldered is first placed upon the chuck B, to which motion is imparted by pulley C, which is, as usual, driven by a belt from a line-shafting. A small quantity of solder is then placed in the can, and the blow-pipe, having been connected to the compressed-air reservoir and electric battery, is held into the can by the workman with the lower end of the bar I against the solder, when in a few minutes, by the electric flame, which is very intense, the solder will be melted and the can will be soldered and can be removed. The sides can be done as well as the bottom and top; but it is then not necessary to place the cans on the chuck, but merely to hold them in the hand, as is usually done.

The great advantages of my improved apparatus for soldering metallic joints, such as cans or other articles, is that the combined compressed air and electric flame make a very intense heat, and the soldering can be done, therefore, very quickly; that the soldering can be done very neatly and expeditiously; it can be done far more economically than in any other manner that I am aware of; it can be done without the use of fire and fuel; it can be done in a far more cleanly manner than any other; and it can be done with very few tools and with less handling.

I reserve as the subject of another application for a patent the mode or process of developing or applying heat and the electric blow-pipe herein set forth, and do not claim them as a part of the invention of this patent; but What I do herein claim is—

1. The combination, with a rotary can-holder, of an electric blow-pipe and solder-holder, having a conduit for compressed air, a conducting-wire for electricity, and a solder-holder, substantially as and for the purpose set forth.

2. An electric blow-pipe and solder-holder comprising, essentially, the tube D, the bar I, provided with curved end $l$, and the electric wire G, arranged substantially as shown and specified.

3. In a soldering-machine, the combination of an adjustable chuck, B, provided with notched sliding pieces $b$ and springs $c$, with a friction-pulley, C, mounted in a stand, A, substantially as shown, and for the purpose described.

4. In a soldering-machine, the chuck B, provided with notched sliding pieces $b$ and springs $c$, and adjusted by means of a treadle, $f$, and lever $e$, pivoted in the stand A, all arranged substantially as shown and described.

In testimony that I claim the above as my invention I have hereunto set my hand.

JOHN CAMPEN.

Witnesses:
C. H. MILLER,
ED. J. G. OTTO.